Jan. 15, 1957

R. H. SPEAKMAN 2,777,519

APPARATUS FOR CUTTING CONTINUOUS
FILAMENTS INTO SHORT LENGTHS
Filed Nov. 30, 1953

INVENTOR:

*Raymond Holden Speakman,*

BY *Cushman, Darby & Cushman*

ATTORNEYS.

2,777,519

APPARATUS FOR CUTTING CONTINUOUS FILAMENTS INTO SHORT LENGTHS

Raymond Holden Speakman, Harpenden, England, assignor to Imperial Chemical Industries Limited, London, England, a corporation of Great Britain Application November 30, 1953, Serial No. 395,239

Claims priority, application Great Britain December 3, 1952

4 Claims. (Cl. 164—61)

This invention relates to a process for cutting continuous filaments into short lengths.

In the manufacture of staple fibre from artificial filaments it is common practice to cut a large number of continuous filaments, commonly referred to as a tow, into short lengths. When the filaments are made from materials such as polyamides or polyesters, owing to the toughness of the filaments the knife blades in the commonly used cutters become blunted very quickly. Furthermore, they cannot easily be sharpened without dismantling the apparatus and interrupting the process.

I have now found that by using a cutter with a continuous shearing action, the cutting edges do not become blunted so quickly. Furthermore, I have found that using circular rotating cutting discs it is possible to sharpen them either continuously or intermittently as required without interrupting the cutting operation.

According to the present invention I provide an improved process for cutting continuous filaments into short lengths wherein a bundle of filaments in substantially zig-zag form is cut through each cross member of the zig-zag, characterised in that a bundle of filaments is laid in substantially zig-zag folds into the nip of two circular disc knife blades, each rotating about an axis through its centre, positioned so that the distance between their centres is just less than the sum of their radii and the overlapping portions are pressed together so that they cut by a continuous shearing action.

The invention also comprises a device for cutting continuous filaments into short lengths of the type wherein a bundle of filaments in a zig-zag form is cut through each straight portion of the zig-zag, characterised in that it comprises a feed mechanism and a means for laying the bundle of filaments in zig-zag folds into the nip of two circular disc knife blades, mounted to rotate in opposite directions about axes through their centres, the centres of the circular discs being spaced apart by a distance just less than the sum of their radii and their axis being slightly off parallel so that the blades are slightly canted and cut with a continuous shearing action.

Any known feed mechanism giving a substantially constant rate of feeding may be used, as for instance, a pair of feed rolls. From the feed rolls the filaments are conveyed towards the nip of the knife blades. A particularly simple and efficient method and apparatus is provided by using a very rapid stream of air for conveying the filaments down a tube and into the nip of the knife discs.

Several methods are available for causing the continuous filaments to follow a zig-zag path. They may for example be fed through a guide or tube which vibrates, or the tow may be subjected to intermittent blasts of air. When the filaments are fed in an air stream down a tube, the end of the tube may be vibrated or moved in small circles. In the latter case the bundle of filaments will follow a helical path until it meets the knife blades when it will be squeezed into a substantially zig-zag path. To facilitate movement, the end of the tube may be flexible or may be bent and fitted with a joint, which permits the end to oscillate or rotate. Another method of operation using the air stream for feeding the tow, is to have a rotating deflector plate e. g. a star shaped wheel, which rotates and interrupts the air jet, which interruption deflects the tow intermittently, thus causing it to follow a zig-zag path.

In the preferred form of my invention I use two air jets. One very rapid air stream is directed down one side of the nip of the rotating cutting discs and conveys the tow or filaments through a tube at a constant speed, which is regulated by a feed roll system by means of which the tow is held before entering the tube. A second air jet impinges transversely on the tow between the end of the tube and the nip of the cutting discs and so deflects the filaments to the other side of the nip. The second air jet is intermittent and synchronised with the feed roll system and the filaments are thus folded into a zig-zag shape of dimensions predetermined by the synchronisation.

Using an apparatus of this type it is possible to feed 10,000 denier tow of polyethylene terephthalate filaments at speeds which may be more than 10,000 feet per minute and cut this to an average staple length of 1½ inches or longer as desired.

The tow is cut near the middle of the zig-zag cross members. It will be appreciated that if the cut occurs on one side away from the middle of these cross members, staples having a shorter and a longer length will result.

The attached drawings illustrate but do not limit my invention:

Figures 1, 2:
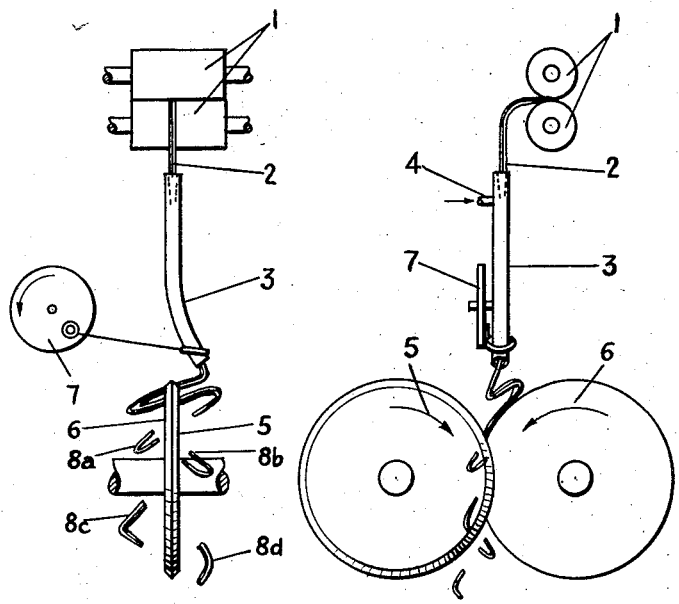
Fig. 1 is a diagrammatic front view of an apparatus wherein the cutting disc knife blades are fed by an oscillating air tube.
Fig. 2 is a diagrammatic side view of Fig. 1.
Figures 3, 4:
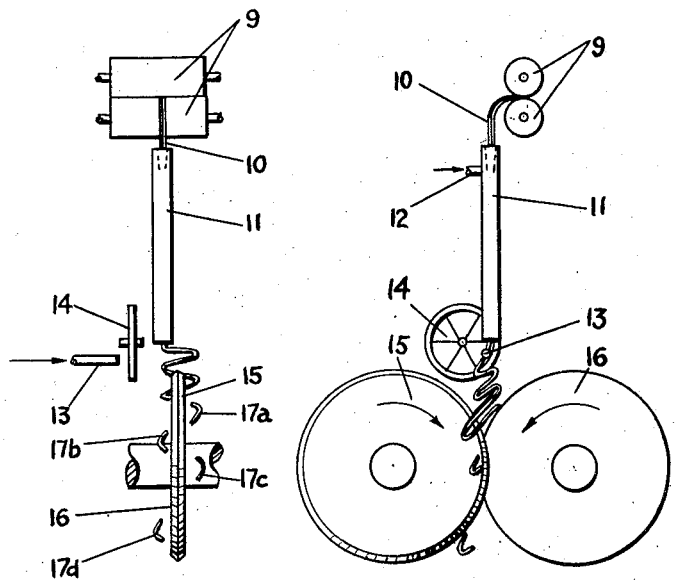
Fig. 3 is a diagrammatic front view of an apparatus wherein two air streams are used.
Fig. 4 is a diagrammatic side view of Fig. 3.

In Figs. 1 and 2 a pair of feed rolls 1 feed a tow 2 of filaments into a flexible air tube 3. A rapid air stream is passed down the tube 3 through the air inlet 4. The bottom portion of the tube 3 is flexible and is moved sideways across the nip of the knife blades 5 and 6 by means of an eccentric drive 7 so that the tow 3 is laid in zig-zag folds into the nip of the knife discs 5 and 6. The knife discs rotate in opposite directions so that the folded tow is cut into staple lengths (8a–8d) which depends on the speed of feeding the tow by the feed rolls 1 and the frequency of oscillation of the end of the air tube 3 imparted by the eccentric drive 7. Figs. 3 and 4 show a cutting device as in Figs. 1 and 2 with a different feed mechanism for the tow. A pair of feed rolls 9 rotate at a controlled speed so that a tow 10 is unwound at a constant peripheral speed of 5000 feet per min. The tow 10 passes down a tube 11 by means of an air stream which enters the tube 11 at an air inlet 12. Near the end of the tube 11 a second air stream from a tube 13 impinges on the tow as it leaves the tube 11. The second air stream from tube 13 is interrupted by a rotating disc 14 having suitable cut-outs. The second air stream from the tube 13 is directed substantially at right angles to the rotating disc knives 15 and 16 so that the tow 10 is laid in a zig-zag form into the nip of the rotating knife blades 15 and 16 and is cut into staple lengths 17a–17d depending on the speed of feeding the tow from the feed rolls 9 and the frequency of interruptions of the second air stream by the rotating disc 14.

What I claim is:

1. An apparatus for cutting filaments into short lengths, wherein a bundle of filaments in zig-zag form is cut, comprising a feed mechanism including a pair of feed rolls, a tube and an air stream, said air stream conveying the filaments down said tube and laying the bundle of filaments into the nip of two circular disc knife blades mounted to rotate in opposite directions about axes through their centers, the centers of said circular discs being spaced apart by a distance just less than the sum of their radii and their axes being off parallel so that the blades are slightly canted and cut with a continuous shearing action through each cross member of the zig-zag folds, and means positioned before said knife blades for making zig-zag folds in the fiber bundle.

2. An apparatus for cutting filaments into short lengths, wherein a bundle of filaments in zig-zag form is cut comprising a feed mechanism including a flexible tube and a rapid stream of air which conveys the filaments down said tube to the nip of two circular disc knife blades mounted to rotate in opposite directions about axes through their centers, the centers of said circular discs being spaced apart by a distance just less than the sum of their radii and their axes being off parallel so that the blades are slightly canted and cut with a continuous shearing action through each cross member of the zig-zag folds, and means to move the said tube to and fro across the nip of the circular disc knife blades and thereby make zig-zag folds in the fiber bundle.

3. An apparatus for cutting tow filaments into short lengths wherein a bundle of filaments in zig-zag form is cut, comprising a feed mechanism including feed rolls, a tube and a rapid stream of air directed down one side of the nip of a pair of rotating cutting disc knife blades, said stream conveying the filaments through the tube at a constant speed which is regulated by the feed rolls, and into the nip of the two circular disc knife blades mounted to rotate in opposite directions about axes through their centers, the centers of said circular discs being spaced apart by a distance just less than the sum of their radii and their axes being off parallel so that the blades are slightly canted and cut with a continuous shearing action through each cross member of the zig-zag folds, and a second intermittent air stream which impinges transversely and intermittently on the tow between the end of the tube and the nip of the circular disc knife blades.

4. An apparatus for cutting tow filaments into short lengths, wherein a bundle of filaments in zig-zag form is cut comprising a feed mechanism including feed rolls, a tube and a rapid stream of air which conveys the filaments down said tube to the nip of two circular disc knife blades mounted to rotate in opposite directions about axes through their centers, the centers of said circular discs being spaced apart by a distance just less than the sum of their radii and their axes being off parallel so that the blades are slightly canted and cut with a continuous shearing action through each cross member of the zig-zag folds, means for directing the rapid air stream down one side of the nip of the rotating cutting disc knife blades to convey said tow through said tube at a constant speed which is regulated by said rolls, and a second intermittent air stream which impinges transversely and intermittently on the tow between the end of the tube and the nip of the circular disc knife blades.

References Cited in the file of this patent

UNITED STATES PATENTS

| | | |
|---|---|---|
| 2,418,125 | Koster et al. | Apr. 1, 1947 |
| 2,447,131 | McDermott | Aug. 17, 1948 |